Jan. 22, 1957  A. W. STELLPFLUG ET AL  2,778,289
STEREO-PHOTOGRAPHIC METHODS AND APPARATUS
Filed July 16, 1953  6 Sheets-Sheet 5
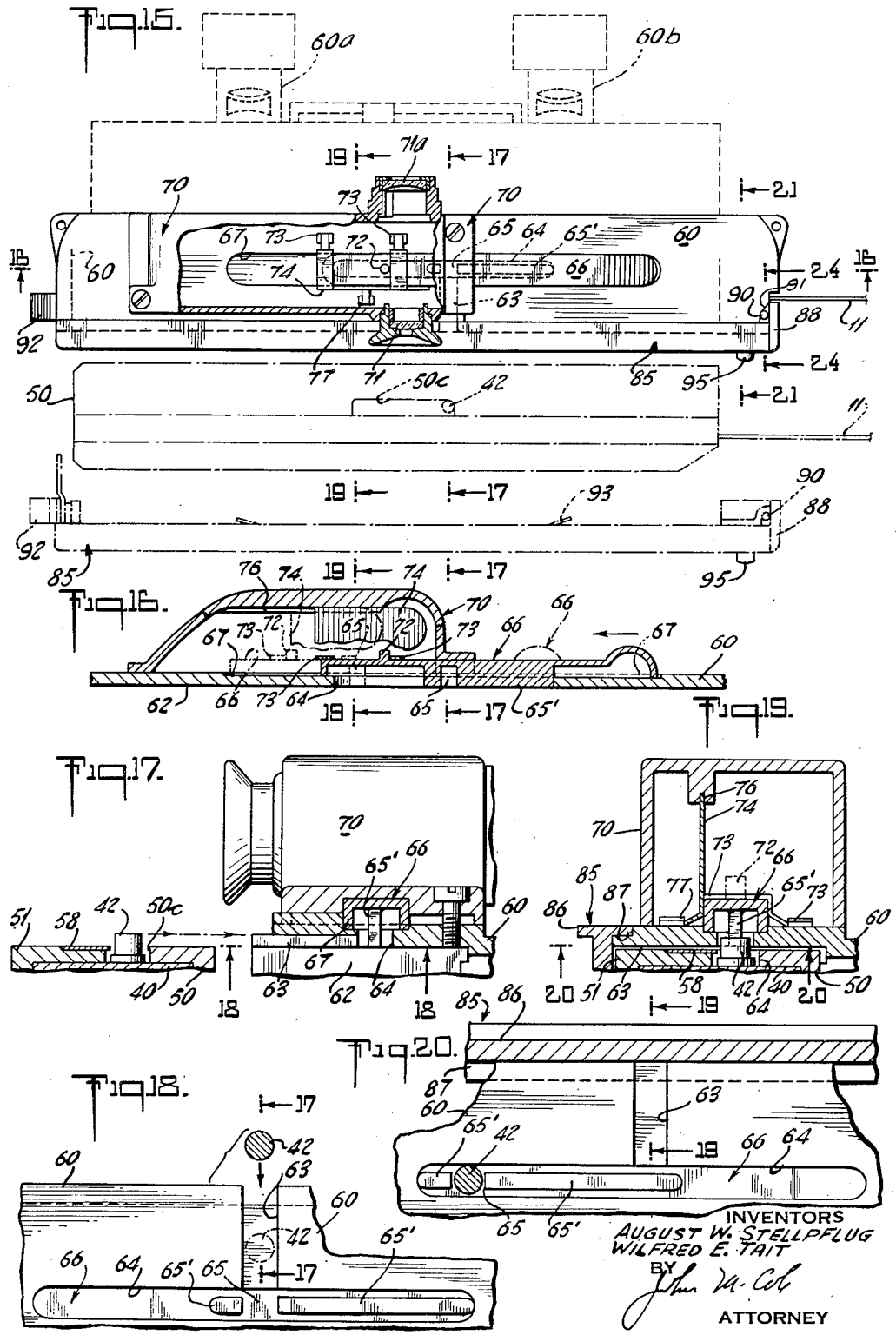
INVENTORS
AUGUST W. STELLPFLUG
WILFRED E. TAIT
BY
ATTORNEY

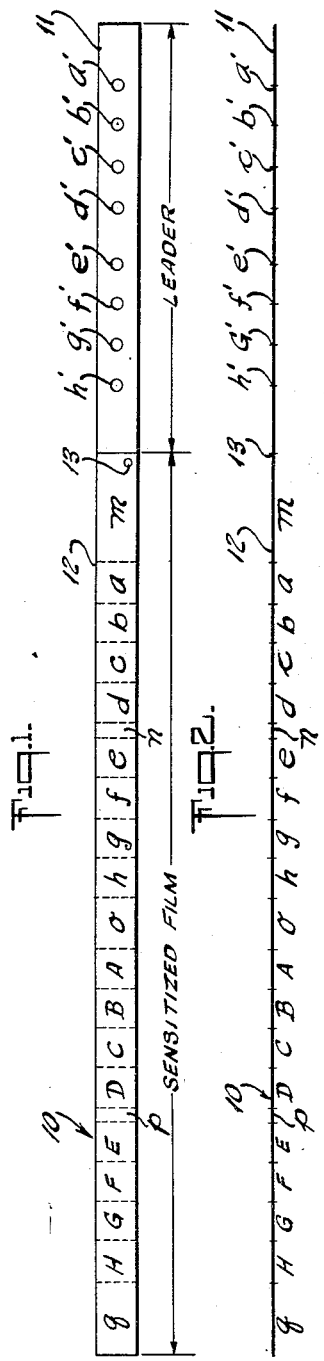

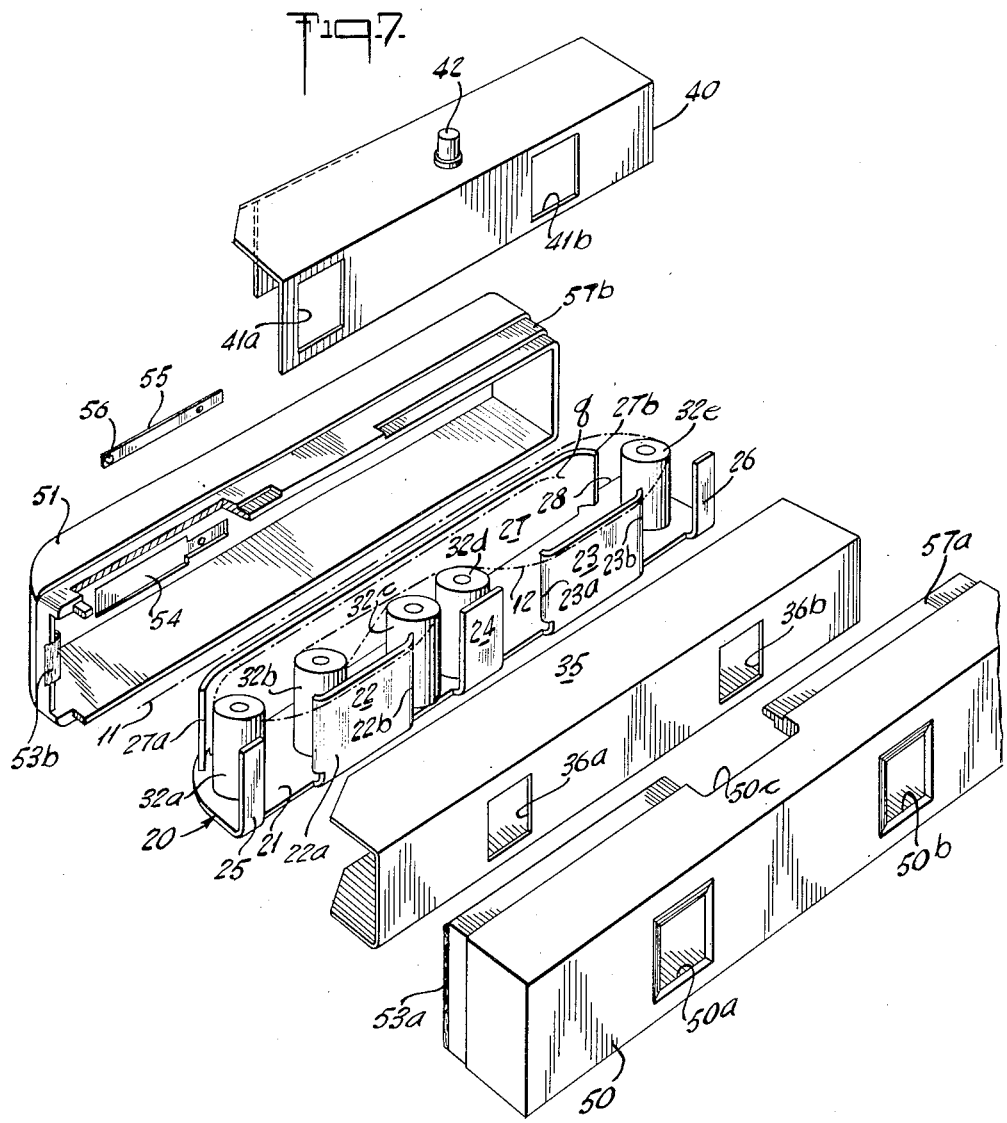

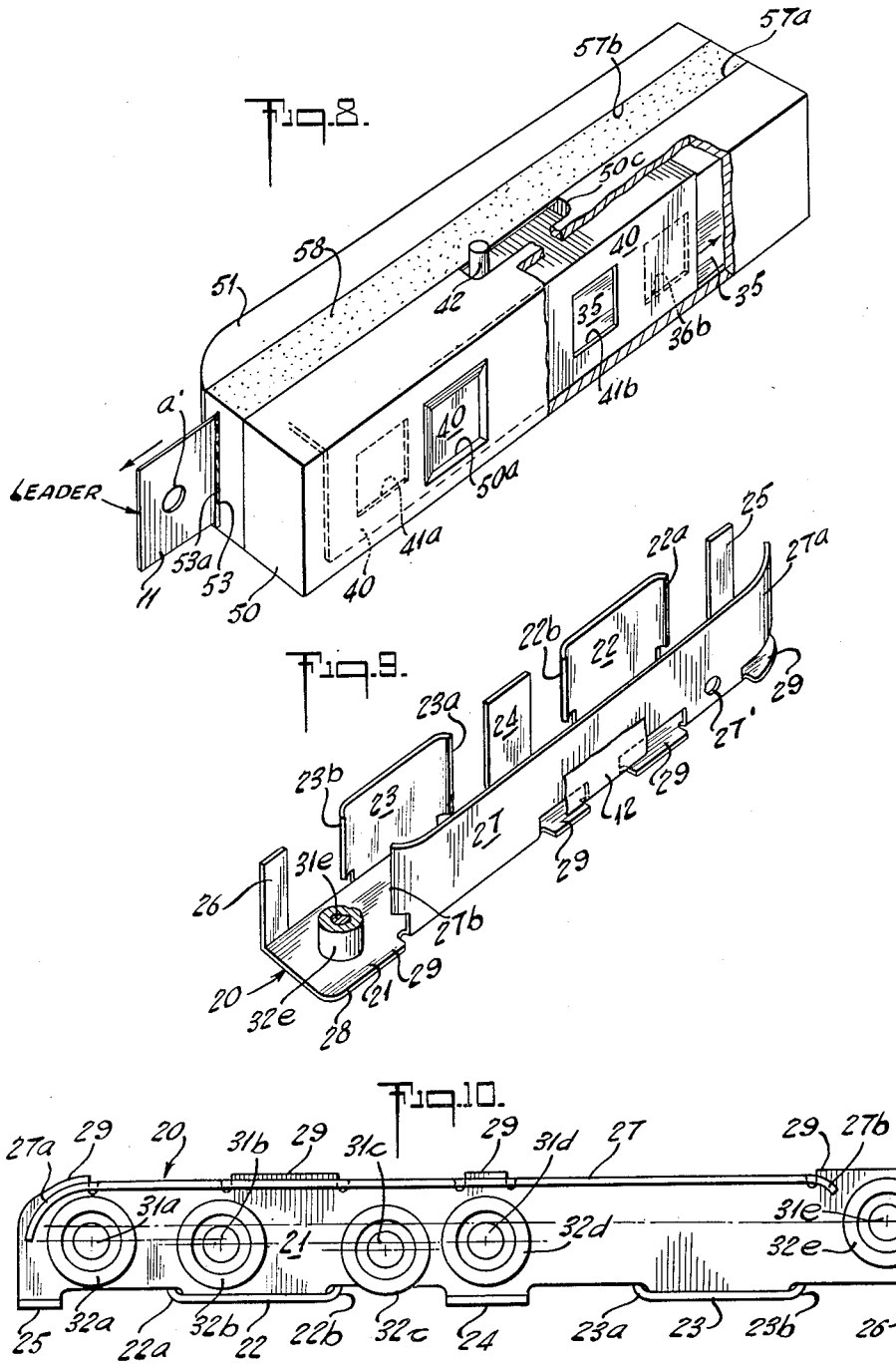

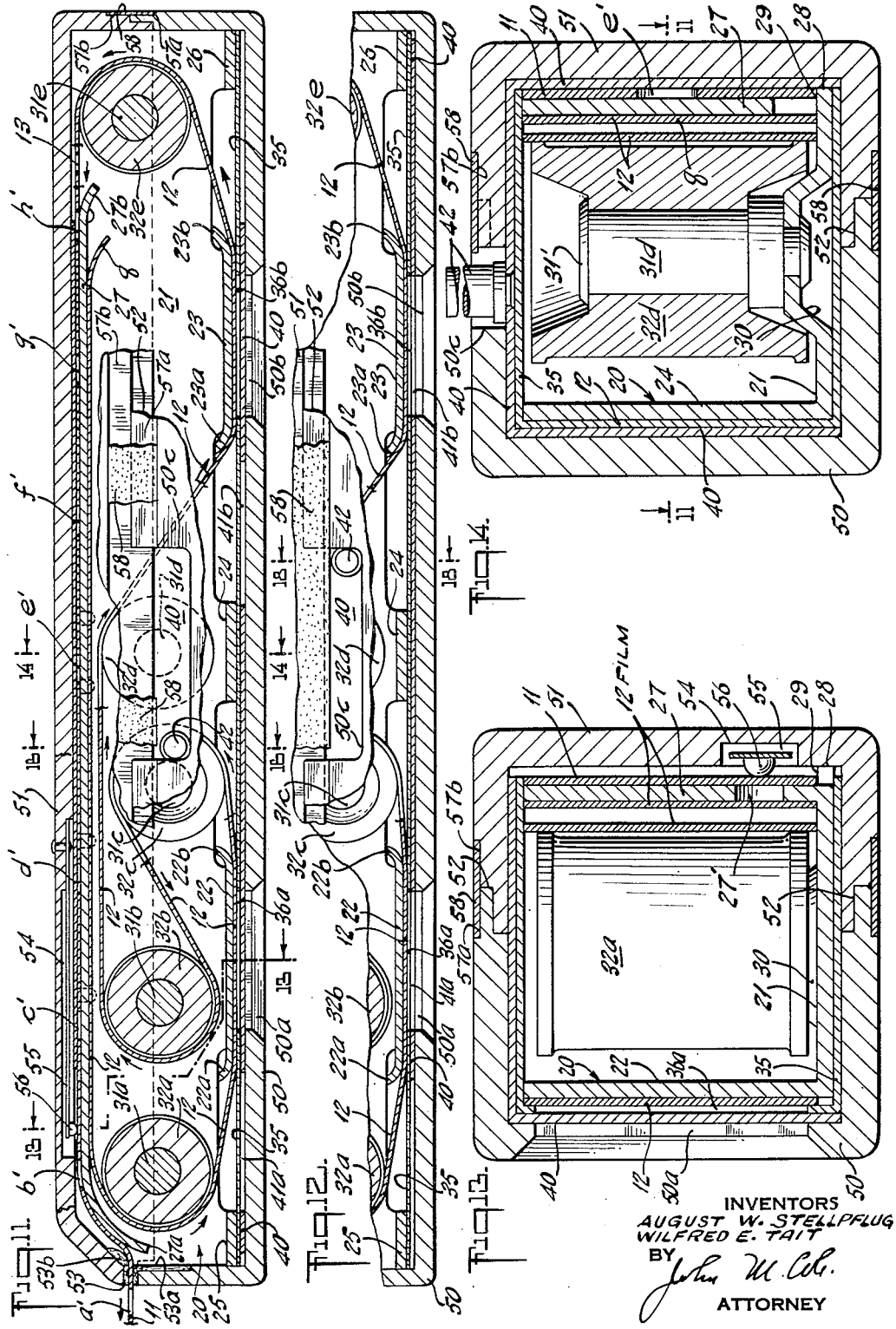

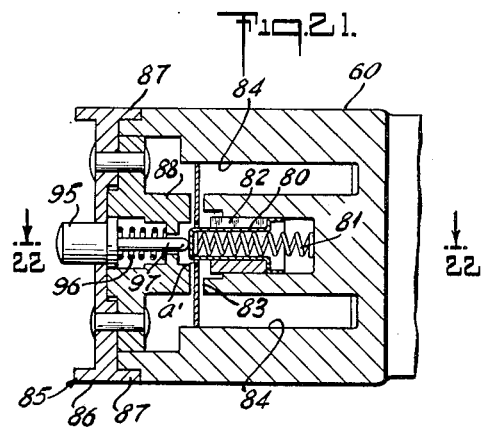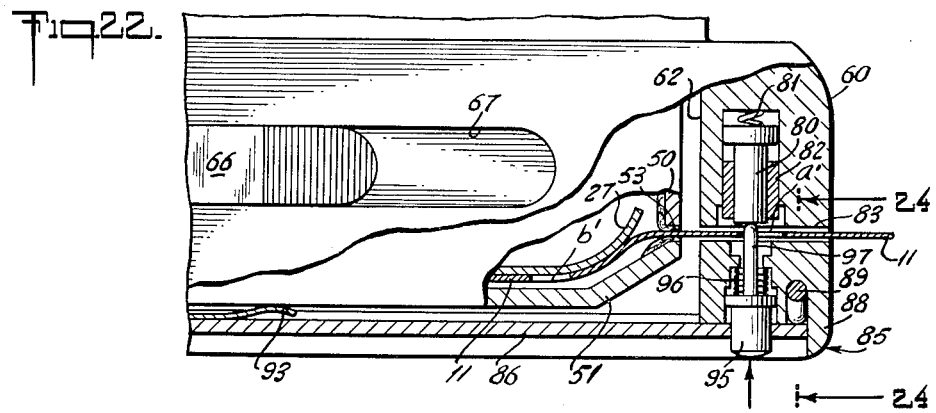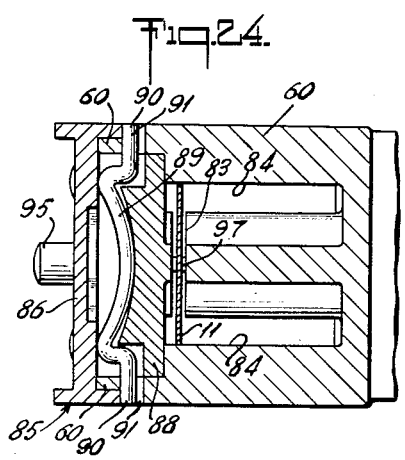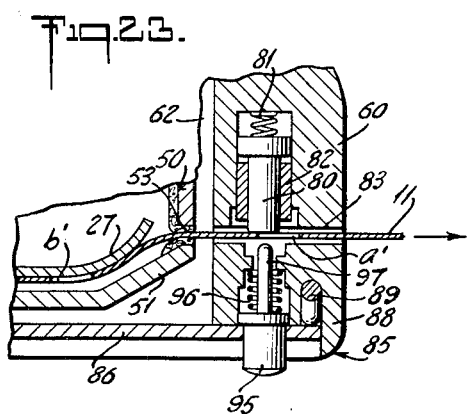

United States Patent Office 2,778,289
Patented Jan. 22, 1957

2,778,289

STEREO-PHOTOGRAPHIC METHODS AND APPARATUS

August W. Stellpflug, Norwalk, and Wilfred E. Tait, New Canaan, Conn., assignors to The Lionel Corporation, New York, N. Y., a corporation of New York Application July 16, 1953, Serial No. 368,392

12 Claims. (Cl. 95—18)

The present invention relates to stereo-photographic methods and apparatus, and is more particularly directed toward the stereo film magazine, its association with the camera body, and the method of taking the stereo pictures.

The more common forms of stereo cameras now in use employ 35 mm. film and take the pictures in such a sequence as to permit use of all or nearly all of the film, but, owing to the length of the frame on 35 mm. film and the necessity of spacing the lenses the inter-ocular distance, it has not been possible to have more than two pairs succeed one another along the film. The usual spacing systems place the pictures in one or the other of the following orders: 1, blank, 2, 1', 3, 2', 4, 3', 5, 4', 6, 5', etc., or 1, 2, 1', 2', 3, 4, 3', 4', etc. In the first system, individual pictures must be cut and reassembled, while in the second only two pictures could be handled as a unit. It has been customary to mount a single pair of pictures in the viewer.

In practicing the present invention, which utilizes less expensive 16 mm. film, it is possible to secure on a single strip of film eight left eye pictures and eight right eye pictures on a length of film which can be handled as a unit and after processing the film may be cut in four parts, two of which may be secured to one holder and the other two to another holder, whereby eight stereo pairs are available for viewing in the two holders.

In order to make it possible to expose the film to secure this large number of stereo images which occupy an overall space greater than the inter-ocular and in the neighborhood of 6 inches, the present invention contemplates the formation of the added length of film into a loop of constant length so that as the film is advanced the length of the frame ⅝ inch (16 mm.), two unexposed areas are brought opposite the lens systems for exposure.

According to the present invention, the camera and magazine are constructed so that the camera may receive the pre-loaded magazine and the film locked against unintentional movement, the magazine may be removed from the camera at any time and replaced by one with different film, and so that it is impossible to accidentally pull the film out of the magazine.

Other and further objects will appear as the description proceeds.

The accompanying drawings show, for purposes of illustrating the present invention, an embodiment in which the invention may take form it being understood that the drawings are illustrative of the invention rather than limiting the same.

In the accompanying drawings:

Figure 1 is a face view of a strip of sensitized film and leader;

Figure 2 is an edge view of the same;

Figure 3 is a view similar to Figure 2 showing a portion of the film looped;

Figure 4 is a diagrammatic view illustrating looped film with trailing and leading portions behind the looped portions so as to shorten the space required;

Figure 5 is a face view of a developed strip of film with the leader attached;

Figures 6a and 6b are views illustrating the two viewing slides each with four stereo pairs made from the single strip of film shown in Figure 5;

Figure 7 is an exploded perspective view showing the various components of the film magazine as seen from the front;

Figure 8 is a perspective view of the assembled film magazine, parts being broken away;

Figure 9 is a perspective view of the film holding frame, taken from the opposite direction from which it appears in Figure 7;

Figure 10 is a top plan view of the frame to illustrate the relative location of the front and rear flanges and the film guiding rollers;

Figure 11 is a section on line 11—11 of Figure 14, the magazine shutter being closed, parts being in elevation;

Figure 12 is a fragmentary view similar to Figure 11, the magazine shutter being opened;

Figures 13 and 14 are cross-sectional views in the lines 13—13 and 14—14, respectively, of Figure 11;

Figure 15 is a top plan view showing in full lines a portion of the camera body and back cover, and indicating in dot and dash lines the magazine and back cover removed, a portion of the finder mechanism being broken away and in finder-shutter closed, magazine shutter closed position to show interior construction;

Figure 16 is a longitudinal fragmentary section on the line 16—16 of Figure 15;

Figure 17 is a transverse sectional view at an enlarged scale on the line 17—17 of Figures 15 and 16, illustrating the insertion of the magazine into the camera body;

Figure 18 is a view taken in the direction of the arrows 18—18 of Figure 17;

Figure 19 is a sectional view at the same scale as Figure 18, taken on the lines 19—19 of Figures 15 and 16, illustrating the magazine in position, the camera cover in place and the magazine shutter and finder shutter open;

Figure 20 is a section on the line 20—20 of Figure 19;

Figure 21 is a section on the line 21—21 of Figure 15, illustrating the film leader stop and release mechanism in the stop position;

Figures 22 and 23 are sections on the line 22—22 of Figure 21, showing the release in two positions;

Figure 24 is a section on the line 24—24 of Figures 15 and 22, illustrating the back cover hinge.

Figure 1 illustrates a magazine load 10 in the form of a combined leader 11 and length of film 12. The over-length is approximately 21 inches, of which 8 inches is leader. The leader may be paper, preferably double, thick, and secured to the film by a short piece of ever-tacky tape, or the entire unit may be made of a single strip of film or of two pieces formed together. Any approved type of film may be used, either color or black and white. Polyester film is preferred because of its toughness.

The leader 11 has eight holes, $a'$, $b'$, $c'$, $d'$, $e'$, $f'$, $g'$ and $h'$. They are spaced approximately ⅝ inch or 16 mm. center to center, except that the spacing of holes $d'$ to $e'$ is greater, approximately ⅞ inch or 22 mm. The reason for this will appear later. The strip has a stop hole 13 out of line with the holes $a'$, etc. and preferably in the leading portion of the film. The sensitized portion is shown marked off by dotted lines, the letters $a$—$h$ and A—H are used to show the areas where exposures are to be made and the letters $m$, $n$, $o$, $p$, $q$, to show areas which are not to be exposed.

It will be apparent that the distance from $a$ to A on the film, at full scale, is much greater—approximately 6 inches—than the inter-ocular distance of 2¾ inches, so that the stereo images cannot be made on a strip of film extended flat. Figure 3 illustrates the forming of the film into loop L so that the distance from a to A is the inter-ocular, assumed to be 2¾ inches. The film from b to o is thus gathered into a loop L with a left and a right-hand portion.

Figure 4 shows the film with the frames a, A and loop L in the same relative positions, but the trailing portion of the film A—H and q, and the leader 11 and leading portion of the film b—o doubled as indicated. This illustrates the position in which the film is carried in the magazine when ready for the first exposure.

Figure 5 illustrates the leader and film after exposure and development. Stereo images in pairs are now on the film at the areas marked a, A, b, B, etc. Four short strips a, b, c, d—A, B, C, D—e, f, g, h—E, F, G, H— are cut out of the long strip of reverse, developed, or positive film and assembled in suitable holders 14, 14 as indicated in Figures 6a and 6b. Each holder thus carries four stereo pairs positioned for viewing in a viewer. Each of the strips is about 2 inches long so that the stereo pairs are spaced 2½ inches.

The magazine herein shown is one in which the film and most of the leader is completely enclosed, so that the loaded magazine may be attached to or detached from the camera at any time without damage to the film, provided the shutter in the magazine is closed.

The magazine is provided with suitable means to form the film and leader into the configuration illustrated in Figure 4 and hold these parts in this position as the film is advanced step by step past the lens systems of the camera.

To assure the proper disposition of the film in the magazine, it is provided with a frame generally indicated at 20 (Figures 7, 9, and 10). This frame is preferably made of light weight stiff aluminum sheet metal stamped to shape, anodized and dyed black. It has a base portion 21, two upwardly bent front flanges or pressure plates 22 and 23 whose central regions are spaced the inter-ocular distance, a central upwardly bent flange 24 and upwardly bent end flanges 25 and 26. The flanges 22, 23 are on one plane and flanges 24, 25 and 26 are in a forward plane distant about the thickness of the film. The side edges of flanges 22 and 23 are bent rearwardly as indicated at 22a, 22b, 23a, 23b. At the rear, the frame 20 has an upwardly bent flange 27 provided at its ends with forwardly bent portions 27a, 27b. The flange 27 is spaced from the rear edge 28 of the base portion 21 of the frame so as to provide narrow platforms indicated at 29.

The bottom 21 of the frame member 20 is offset upwardly as indicated at 30 (Figure 14). Five such offsets are provided at proper spacings lengthwise and crosswise of the bottom of the frame member and these offsets carry pins 31a, 31b, 31c, 31d, and 31e. The pins carry black anodized aluminum film guiding rollers 32a, 32b, 32c, 32d, and 32e. The rollers are held in place by upsetting the ends of the pins as indicated at 31' (Figure 14).

The film and leader are wrapped or wound about the frame parts and guiding rollers as indicated in Figures 7, 8 and 11–14. The trailing end q of the film is in front of the rear flange 27. It extends to the left along this flange and then passes about roller 32a at the left, then passes in front of the pressure plate 22 being guided by the bent flanges 22a, 22b and then on to the guiding roller 32c, then goes to the left as shown in the drawings and is passed about the roller 32b, which is to the rear of the plate 22, then to the right guiding roller 32d located directly behind flange 24, then on to pressure plate 23, then about right-hand roller 32e and thence behind the rear flange 27. The leader 11 is behind the flange 27 and extends to the left as indicated. Pulling on the leader causes the film to follow the path determined by the rollers. The rollers are so located as to guide the film and keep the opposed portions out of contact with one another. To accomplish this, the roller 32a may, as indicated more clearly in Figure 10, be placed at an optimum position to the rear of the plane of the flanges 22, 23, the rollers 32b and 32d may be spaced forward an equal amount so as to be slightly nearer the plane of the flanges 22, 23, the roller 32c may be placed still closer to the plane on flanges 22 and 23, and the roller 32e farther to the rear than roller 32a. This makes it possible to have the leading end of the film delivered from roller 32e behind flange 27 and to keep the film which passes about the rollers 32, b, c, d, from contacting with other portions of the film. A similar looped film arrangement may be had by having the roller 32b to the right of the central rollers, but such offers greater resistance to the film movement.

The film is protected by a suitable shielding means which prevents unwanted light from reaching it and provides frame openings for the pictures. As shown here, the shielding means is in the form of a channel-shaped black paper shield 35 having accurately placed frame openings 36a, 36b centered over the flanges 22 and 23. When the parts are all assembled, the shielding means also acts to hold the film flat against the pressure plates or flanges.

A reciprocable shutter 40 is placed about the assembled frame, film and film shielding means. This shutter has openings 41a, 41b adapted to be placed in line with the openings 36a, 36b of the shielding means, or to be moved so that the shutter covers both of these openings. The shutter is in the closed position in Figures 8, 11 and 15 and in the open position in Figures 12 and 18. The shutter is provided with an operating pin 42. This shutter is made of thin sheet metal.

The loaded frame, shield and shutter are received in a box-like member 50 and the closure is effected by a cover 51 at the rear. The parts 50 and 51 are preferably made of aluminum, and form a totally enclosing light-tight housing for the film-carrying parts. The box 50 has two square window openings 50a, 50b spaced the inter-ocular distance and has an upwardly opening slot 50c of the proper length to receive and accommodate the pin 42 on the magazine shutter. The box 50 and cover 51 are provided with a telescoping joint as indicated at 52 (Figures 13 and 14). They are dimensioned so as to provide a narrow slit 53 at the left through which the leader may extend and are provided with velvet strips 53a, 53b to line the slit. The cover 51 is recessed as indicated at 54 (Figures 7, 11 and 13) to receive a leaf spring 55 having a stop pin 56 located in the proper position to drop into the hole 13 in the film. The box and cover are also recessed as indicated at 57a, 57b to receive a strip of tape 58 by which the box and cover may be securely held together when in use. The tape passes to the rear of the pin 42 so that the pin may be readily shifted.

When the magazine is loaded a short portion of the leader 11 protrudes from the magazine, as indicated in Figure 8, and the magazine is light-tight because the shutter is at the left. It can be sealed in this position when the loading takes place.

Figures 15 to 24 illustrate a new form of stereo camera with which the film magazine above described is intended to be used, and the interrelations of such film magazine and camera. The camera body is shown at 60. At the front are the two stereo-lens systems diagrammatically indicated at 60a, 60b, as well as suitable shutter mechanism and lens speed adjustment mechanism not shown.

The camera body 60 opens rearwardly to provide a receiver 62 of just the proper size to fit the magazine. The lower face of the upper wall of the body has a rearwardly opening groove 63 which opens into a longitudinal slot 64. The groove 63 is properly located to receive the magazine shutter pin 42 in the closed position and allow the insertion of the magazine into the camera body. When pin 42 is all the way in, it enters a notch 65 in the rib 65' of a slider 66 movable in a groove 67 in the top of the camera body and protruding through the slot 64.

After the magazine has been placed in the camera and the film brought to the initial position in a manner to be described and the camera back, to be described, placed in position, the camera is ready for use. To open the magazine, one shifts the slide 66 to the left, Figures 15 and 16. This carries the pin 42 to the left, as indicated in Figures 15, 19 and 20, and opens the magazine shutter. It also shifts the pin 42 to the left of groove 63 and locks the magazine in place so that it cannot now be unintentionally removed.

The slide 66 extends under a view finder housing 70 carrying view finder lenses 71, 71a. A pin 72 on slider 66 is engageable with properly spaced legs 73, 73 of a slidable sheet metal view finder shutter 74 to shift it relative to the finder lenses so that the finder is open only when the magazine shutter is fully open and is closed on the initial closing movement of the magazine shutter. The finder shutter 74 enters a groove 76 in the housing 70, and the front legs 73 and rear leg 77 ride on the surface of the camera body.

The right-hand end of the camera body, Figures 15 and 22, carries a plunger 80 pressed rearwardly by a spring 81 and held against removal by a split bushing 82. The plunger protrudes to the rear of the surrounding surface 83 on the camera body. When the magazine is inserted, the film extends between the guides 84, 84 and out over the plunger 80. The film leader 11 is pulled sufficiently to permit aligning the first hole a' with the plunger 80, thereby placing the film in proper position for the first frame.

The back of the camera is designated generally at 85. It includes a channel strip 86 with flanges 87 which fit the grooved edge of the camera body, and a release block 88 riveted to the strip. A release block spring 89 is secured between the parts 86 and 88 and has pintle forming ends 90 which enter notches 91 in the camera body. The other end of the camera back 85 has a release lock assembly indicated at 92. The cover carries a spring 93 which presses the magazine forwardly.

Opposite the body-carried plunger 80, the release block 88 carries a push button 95 biased rearwardly by a spring 96 bearing against plate 86 so as to be clear of the leader. The front end 97 of the push button 95 is of smaller diameter than the plunger 80.

After the pair of stereo exposures have been made, the operator then advances the film to the position for taking the next pair. To do this, the operator first presses the push button 95 forwardly, as indicated in Figure 22, thereby depressing the plunger 80 and making it possible for one to make a slight advance of the film to bring the side wall of the hole in the film against the reduced or forward end 97 of the push button 95. The slight advance thus permitted to the leader, as indicated in this figure, pulls the leader far enough forward to hold the plunger 80 in depressed position.

The operator then releases the push button 95, so that it retreats to the position shown in Figure 23. The operator then pulls on the leader 11 to advance the film. As the leader is overlying the end of plunger 80, this plunger cannot interfere with the movement of the film until the next hole, for example b', is opposite the plunger 80, whereupon the plunger enters this hole and no further movement of the leader and film can take place. This has advanced the film so that areas b, B are opposite the lens systems.

This operation is repeated until all eight of the stereo frames are taken. After the last exposure has been made, the film is pulled slightly, whereupon the stop pin 56 enters the hole 13 in the film and the hole 27' in the frame 27 and prevents pulling the film out of the camera. The magazine shutter operating device can then be shifted to close the magazine shutter, the back of the camera removed, and, as pin 42 is again aligned with groove 63, the magazine may be removed from the camera and the film processed.

It will be noted that the spacing of the holes d', e' is greater than the spacing of the other holes, so that narrow, unexposed areas n and p appear on the film. These indicate where to cut the film so as to provide four short pieces of film, each with four pictures. These strips are then rearranged in the viewers as in Figures 6a and 6b.

It will also be noted that, provided preloaded magazines are available for the various types of film to be used, one can readily shift from one type of film to another. At any time after a loaded magazine has been placed in the camera and the magazine shutter shifted to open the magazine for picture taking, it is possible for the user to reclose the magazine shutter, open the back of the camera, remove the magazine and film and substitute another loaded magazine. Therefore it is not necessary for the user to take all eight stereo pictures on a strip of film in succession. A magazine can be used, laid aside, and another magazine substituted at will.

If one desires, one can alternately cap and expose the lenses and advance the film after both exposures have been made, and thereby obtain sixteen individual exposures instead of eight stereo pairs.

Since it is obvious that the invention may be embodied in other forms and constructions within the scope of the claims, we wish it to be understood that the particular form shown is but one of these forms, and various modifications and changes being possible, we do not otherwise limit ourselves in any way with respect thereto.

What is claimed is:

1. A film magazine comprising an elongated frame member having a base, two upwardly extending coplanar film guiding flanges along the front of the base spaced from one another and from the ends of the base, five film guide rollers mounted on the base for rotation about vertical axes, two of the rollers being near the ends of the base, one end roller disposed to guide film onto the front of one of the front flanges, the other end roller disposed to guide film so that it may be pulled from the other front flange, two of the rollers being centrally disposed between and to the rear of the front flanges, one disposed to receive film from the first front flange and the other to deliver it to the other front flange, the fifth roller being disposed in a position to form a film loop between the centrally disposed rollers, film-shielding means disposed in front of the film as it extends from one end roller to the other and having a picture-framing aperture in front of each of said first mentioned front flanges through which the film may be exposed, and an inverted channel-shaped apertured shutter member disposed about the frame and shielding means and reciprocable therealong, the shutter being movable between positions where it opens and closes the apertures in the film-shielding means.

2. A film magazine as claimed in claim 1, having a light tight housing about the frame, shielding means and shutter and provided with openings opposite the openings in the shielding means.

3. A film magazine as claimed in claim 2, wherein the shutter has a shifting pin projecting through a slot in the housing.

4. A film magazine as claimed in claim 2, wherein the housing has a slot through which a film leader may pass.

5. A film magazine comprising an elongated frame member having a base, two upwardly extending coplanar film guiding flanges along the front of the base spaced from one another and from the ends of the base and a rear upwardly extending film guiding flange, and five film guide rollers mounted on the base for rotation about vertical axes, two of the rollers being near the ends of the base, one end roller disposed to guide film onto the front of one of the front flanges, the other end roller disposed to guide film from the front of the other front flange onto the rear of the rear flange, two of the rollers being centrally disposed between and to the rear of the front flanges, one disposed to receive film from the first front flange and the other to deliver it to the other front flange, the fifth roller being disposed between the rear and front flanges and adapted to form a film loop between the centrally disposed rollers.

6. A film magazine as claimed in claim 5, wherein the rear flange is curved forwardly at its ends to guide film to and from the end rollers.

7. A film magazine as claimed in claim 5, wherein the base has rearwardly extending narrow ledges engageable with the edge of film outside the rear flange.

8. In combination, a film magazine for stereo cameras comprising an elongated frame having film guiding means about which a length of film and a leader is adapted to be threaded to dispose two portions of the film spaced inter-ocularly, an elongated slidable shutter in front of the film path and having two inter-ocularly spaced picture framing openings and a shutter shifting member, a two part elongated box enclosing the frame and shutter, the front part of the box having exposure openings closed when the shutter is in one position and opened when it is in the other position, one of the parts having a slot through which the shutter shifting member projects, and a camera body having a receiver for the magazine, the receiver having a rearwardly opening groove to admit the shutter shifting member when in position to close the picture framing openings and a movable member carried by the camera body for moving the shutter shifting member lateral of the groove to lock the magazine in the camera and open the exposure openings of the magazine.

9. In combination, an elongated, normally horizontal film magazine comprising an elongated light-tight box provided at the front with exposure openings, box enclosed film guiding means and box enclosed shutter for opening and closing picture openings and provided with a vertically protruding shutter shifting member, and a camera body having a rearwardly opening groove to admit the shutter shifting member when in position to close the picture framing openings, and a movable member carried by the camera body for moving the shutter shifting member lateral of the groove to lock the magazine in the camera and open the exposure openings of the magazine.

10. Stereo-photographic apparatus comprising a camera body having two inter-ocularly spaced lens systems, a rearwardly opening film magazine receiver, and a cover for the receiver, and a film magazine adapted to be loaded with a strip of film provided with a protruding leader having apertures spaced apart and adapted to be advanced step by step in taking successive pictures, the magazine having openings opposite the lens system, a shutter for closing and opening said openings, means to guide the film past the openings including means to gather the film between the openings into a loop of constant length, the shutter having a protruding shutter shifting member, the film magazine and camera body having cooperative parts which permit insertion of the magazine into the receiver and removal thereof only when the shutter is closed, and the opening of the shutter when the magazine is in place in the receiver, cooperative devices carried by the camera body and the cover for arresting movement of the apertured leader or releasing it for advancing one step and a camera carried magazine shutter opener.

11. In combination, a film magazine adapted to be loaded with a strip of film having a leader protruding from the end of the magazine and provided with spaced apertures, a camera body having a receiver for the magazine and a camera back, the body and back when assembled having a passageway for the leader, one of said camera parts having a spring pressed plunger biased to enter an aperture in the leader, the other camera part having a spring pressed plunger biased away from the first plunger but engageable therewith to depress it, the second plunger being of smaller dimension than the aperture and disposed in advance of the trailing edge of the aperture, so that, when the plungers are depressed, the leader may be shifted partway across the first plunger to hold it down and upon release the second plunger allow movement of the leader to thus bring the next aperture in line with the first plunger.

12. Stereo-photographic apparatus comprising a camera body provided with two stereo lens systems, a view finder and a shiftable shutter for opening and closing the view finder, and having a rearwardly opening magazine receiver; a film magazine having two openings opposite the lens systems, means for guiding film past the openings in the magazine, a magazine shutter movable to open and close the magazine openings; cooperable means on the camera body and magazine which permit insertion of the magazine into the receiver or its removal therefrom only when the magazine shutter is in closed position; and a common operator effective when the magazine is in the receiver for shifting the magazine shutter between open and closed positions and for shifting the finder shutter between open and closed positions, whereby the finder is available for use only when the film is uncovered for exposure.

References Cited in the file of this patent

UNITED STATES PATENTS

| | | |
|---|---|---|
| 2,006,914 | Fayolle | July 2, 1935 |
| 2,063,285 | Wittel | Dec. 8, 1936 |
| 2,139,782 | Albada | Dec. 13, 1938 |
| 2,505,661 | Briskin | Apr. 25, 1950 |

FOREIGN PATENTS

| | | |
|---|---|---|
| 212,439 | Switzerland | Feb. 17, 1941 |